US011332031B2

(12) United States Patent
. et al.

(10) Patent No.: US 11,332,031 B2
(45) Date of Patent: May 17, 2022

(54) LOCATING OPTIMAL CHARGE STATIONS

(71) Applicant: Kyndryl, Inc., New York, NY (US)

(72) Inventors: Rajmohan ., Thalasserry (IN); Dinesh K N, Bangalore (IN); Pramod Vadayadiyil Raveendran, Bengaluru (IN); Rajith P M, Bangalore (IN)

(73) Assignee: Kyndryl, Inc., New York, NY (US)

( * ) Notice: Subject to any disclaimer, the term of this patent is extended or adjusted under 35 U.S.C. 154(b) by 51 days.

(21) Appl. No.: 17/029,101

(22) Filed: Sep. 23, 2020

(65) Prior Publication Data
US 2022/0089056 A1 Mar. 24, 2022

(51) Int. Cl.
*B60L 53/63* (2019.01)
*B60L 53/30* (2019.01)
*B60L 53/65* (2019.01)

(52) U.S. Cl.
CPC ............ *B60L 53/63* (2019.02); *B60L 53/305* (2019.02); *B60L 53/65* (2019.02); *B60L 2240/421* (2013.01); *B60L 2240/547* (2013.01)

(58) Field of Classification Search
CPC ........ B60L 53/63; B60L 53/305; B60L 53/65; B60L 2240/421; B60L 2240/547
USPC ........................................................ 320/109
See application file for complete search history.

(56) References Cited

U.S. PATENT DOCUMENTS 10,604,027 B2 3/2020 Dow
2016/0025506 A1 1/2016 Penilla
2017/0193424 A1* 7/2017 Botea ................... G06Q 10/047
2018/0113464 A1 4/2018 Bostick
2019/0011931 A1* 1/2019 Selvam ................. G08G 1/202

OTHER PUBLICATIONS

Disclosed Anonymously et al., "Cognitively applying user preference in identifying the charging station for electric cars", An IP.com Prior Art Database Technical Disclosure, IP.com No. IPCOM000261325D, IP.com Electronic Publication Date: Feb. 22, 2020, 3 pages.
Yi et al., "Deploying Energy Routers in an Energy Internet Based on Electric Vehicles" IEEE Transactions on Vehicular Technology, vol. 65, No. 6, Jun. 2016, 12 pages.
Disclosed Anonymously et al., "Electric Car Charging on the Go", An IP.com Prior Art Database Technical Disclosure, IP.com No. IPCOM000262663D, IP.com Electronic Publication Date: Jun. 18, 2020, 4 pages.
Disclosed Anonymously et al., "Method and System for Providing Optimal Charging Service to Electric Vehicles", An IP.com Prior Art Database Technical Disclosure, IP.com No. IPCOM000259784D, IP.com Electronic Publication Date: Sep. 18, 2019, 3 pages.

(Continued)

*Primary Examiner* — Paul Dinh
(74) *Attorney, Agent, or Firm* — Erik Swanson, Esq.; Kevin P. Radigan, Esq.; Heslin Rothenberg Farley & Mesiti P.C.

(57) ABSTRACT

Embodiments of the present invention provide methods, computer program products, and systems. Embodiments of the present invention can in response to receiving a request for a charge, dynamically determine an optimal charging station using a bipartite graph. Embodiments of the present invention can then navigate a user to the dynamically determined optimal charging station.

20 Claims, 5 Drawing Sheets

(56) References Cited

OTHER PUBLICATIONS

Disclosed Anonymously et al., "Method and System for Scheduling Electric Vehicle Charging using a Smart Network Mechanism", An IP.com Prior Art Database Technical Disclosure, IP.com No. IPCOM000215772D, IP.com Electronic Publication Date: Mar. 11, 2012, 2 pages.

Zhao et al., "An Intelligent Solar Powered Battery Buffered EV Charging Station with Solar Electricity Forecasting and EV Charging Load Projection Functions", IEEE International Electric Vehicle Conference 2014, Florence, Italy, Dec. 17-19, 2014, 7 pages.

\* cited by examiner

LOCATING OPTIMAL CHARGE STATIONS

BACKGROUND

The present invention relates generally to charging electric vehicles, and more particularly dynamically determine an optimal charging station for respective electronic vehicles.

An electric vehicle charging station, also called EV charging station, typically refers to an infrastructure that supplies electric energy for the recharging of plug-in electric vehicles including electric cars, neighborhood electric vehicles and plug-in hybrids.

For charging at home or work, some electric vehicles have converters on board that can plug into a standard electrical outlet or a high-capacity appliance outlet. Others either require or can use a charging station that provides electrical conversion, monitoring, or safety functionality. Many charging stations support faster charging at higher voltages and currents than are available from residential charging stations. Public charging stations are typically on-street facilities provided by electric utility companies or located at retail shopping centers, restaurants and parking places, operated by a range of companies.

Charging stations provide a range of heavy duty or special connectors that conform to the variety of standards. For common DC rapid charging, multi-standard chargers equipped with two or three of the Combined Charging System (CCS), CHAdeMO, and AC fast charging has become the de facto market standard in many regions. In some cases, some roads can include charging technology that supports "charging while driving".

SUMMARY

According to an aspect of the present invention, there is provided a computer-implemented method. The method comprises in response to receiving a request for a charge, dynamically determining an optimal charging station using a bipartite graph; and navigating a user to the dynamically determined optimal charging station

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize deficiencies in charging stations. Often, they can become crowded and develop long queue times during peak hours and periods of travel. Embodiments of the present invention also recognize that traditional charging stations and route optimizations rely on variables such as type of vehicle, availability of energy, traffic, charging requirements, criticality of need, supply and demand, availability and proximity of charging stations, and operating costs and mountaineer are traditional factors considered in managing and generating route recommendations. As such, embodiments of the present invention provide solutions for managing charge, electric grids, and generating routes to an optimal charge station based on a user requirements. As used herein, user requirements refer to one or more user-defined parameters. User requirements can include the user's mood, itinerary, cost of charge, meal preference, points of interest defined by the user, etc. Accordingly, embodiments of the present invention can dynamically locate and identify an optimal charging station that fits within the user's requirements. For example, embodiments of the present invention can dynamically identify an optimal charging station such that the user's vehicle is charged within a certain radius of the user while the user is eating at a restaurant along the route to the user's final destination.

In this way, embodiments of the present invention can dynamically determine an optimal route that satisfies or otherwise fulfills the user request according to different priorities the user has (e.g., weekend itinerary, business trips, vacation, etc.). Embodiments of the present invention can then allocate and route vehicles to one or more charging stations (e.g., existing charging stations, solar charging stations, mobile charging stations, etc.) based on capacity (e.g., available capacity to charge a vehicle), time requested, and predicted time needed to complete a charge. In this manner, as described in greater detail later in this specification, embodiments of the present invention provide a more comprehensive optimization of user requirements to locate an optimal charging station by generating a bipartite graph and using the generated bipartite graph to select and subsequently navigate to the selected optimal charging station.

Embodiments of the present invention presents users an opt-in/opt-out mechanism that enables a user to participate in the charging service. In some embodiments, users can be notified when data is collected and/or otherwise used (e.g., vehicle information such as current charge, estimated time to charge, destinations, route to destination, waypoints, average power consumption, etc.).

Figure 1:
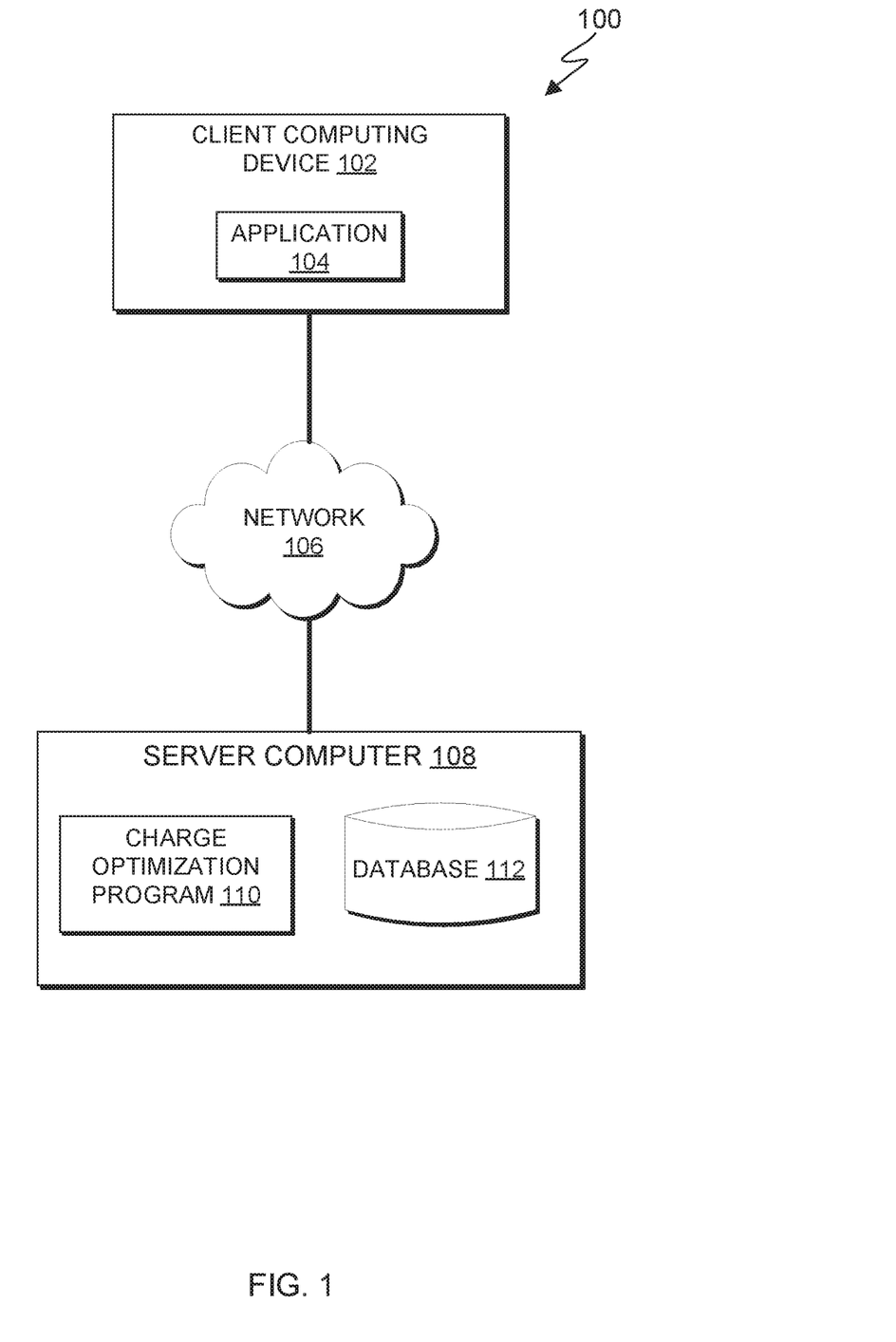
FIG. 1 depicts a block diagram of a computing system, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 5.

In this embodiment, client computing device 102 is a user device associated with a user and includes application 104. Application 104 communicates with server computer 108 to access charge optimization program 110 (e.g., using TCP/IP) to access user and database information. Application 104 can further communicate with charge optimization program 110 to transmit instructions to dynamically locate and identify an optimal charging station that fits within the user's requirements, as discussed in greater detail with regard to FIGS. 2-4.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts charge optimization program 110 and database 112. In this embodiment, charge optimization program 110 resides on server computer 108. In other embodiments, charge optimization program 110 can have an instance of the program (not shown) stored locally on client computer device 102. In yet other embodiments, charge optimization program 110 can be stored on any number or computing devices.

Charge optimization program 110 dynamically locate and identify an optimal charging station that fits within the user's requirements. In this embodiment, charge optimization program 110 can include one or more modules (not shown) that enable charge optimization program 110 to dynamically determine an optimal charging station and subsequently route the user to the determined optimal charging station as discussed in greater detail with respect to FIG. 2.

In this embodiment, charge optimization program 110 connects one or more charging stations (e.g., solar, traditional, mobile, etc.) to a central system. Charge optimization program 110 generates a bipartite graph comprising two sides. In this embodiment, charge optimization program 110 includes nodes on the left side that represent vehicles connected to the central system node, with each vehicle node having a set of attributes associated with the vehicle and user such as vehicle trip information, type of trip (e.g., leisure, business, etc.), progress of trip, current route information (e.g., navigation information), type of vehicle, battery charge level of the vehicle, average speed of the vehicle, mileage of the vehicle at different terrains, historical energy efficiency, battery condition score, price constraints, etc.

Charge optimization program 110 labels the right side of the graph with nodes representing charging station with each charging station, each charging station node including attributes associated with respective charging locations such as total charging capacity of station, current charge available at the station, price of charging per unit, current day traffic patterns, recommendations, insights (traffic patterns, charge draining etc.) from previous historical data, number of vehicles in the queue, type of vehicles in the queue, sun forecasting details, weather information etc. Charge optimization program 110 calculates the edge to be the distance between the vehicle to the charging stations that can fulfill (e.g., meet) user requirements and is along the navigation route.

Figure 2:
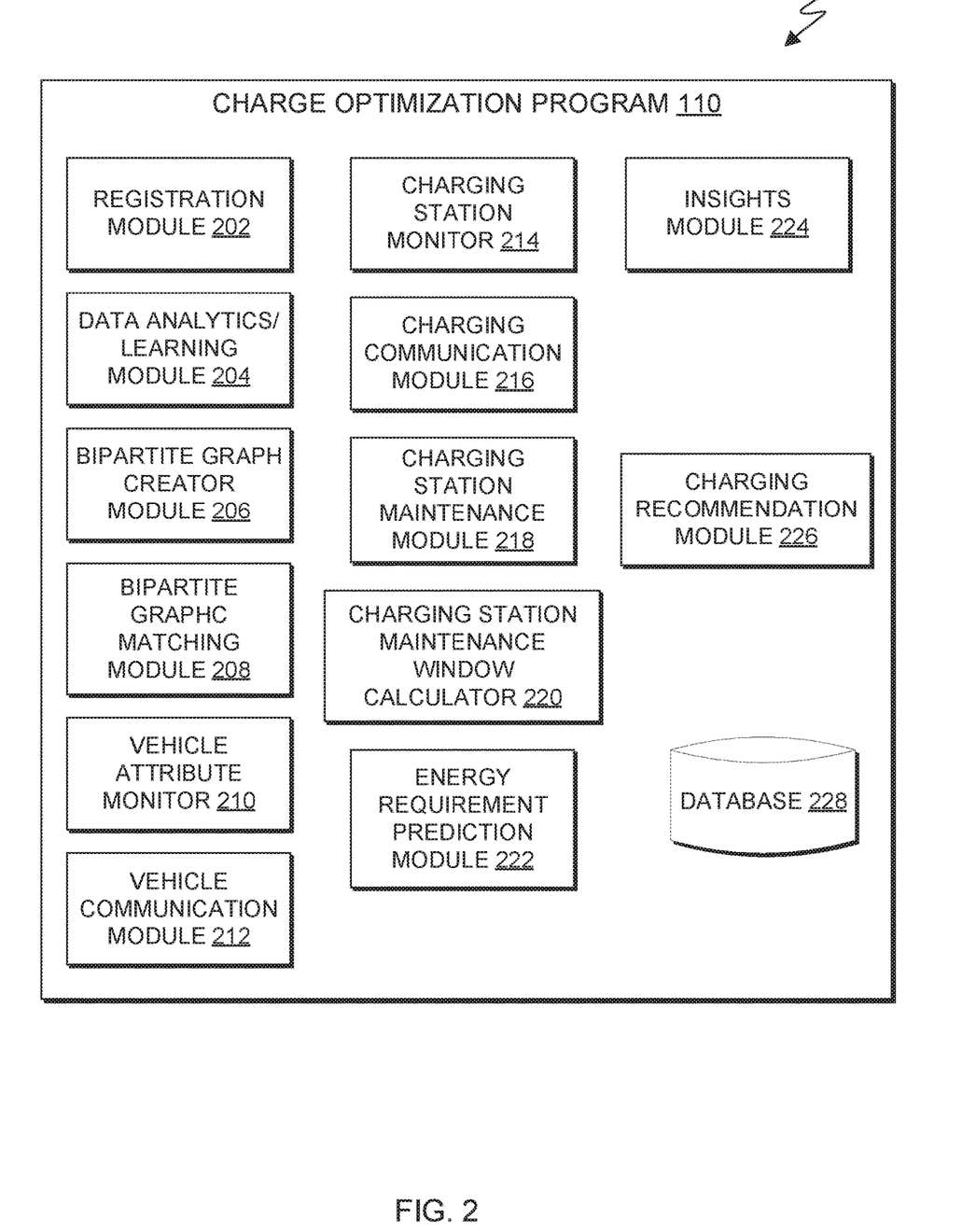
FIG. 2 depicts a block diagram of a charge optimization program, in accordance with an embodiment of the present invention.
Figure 3:
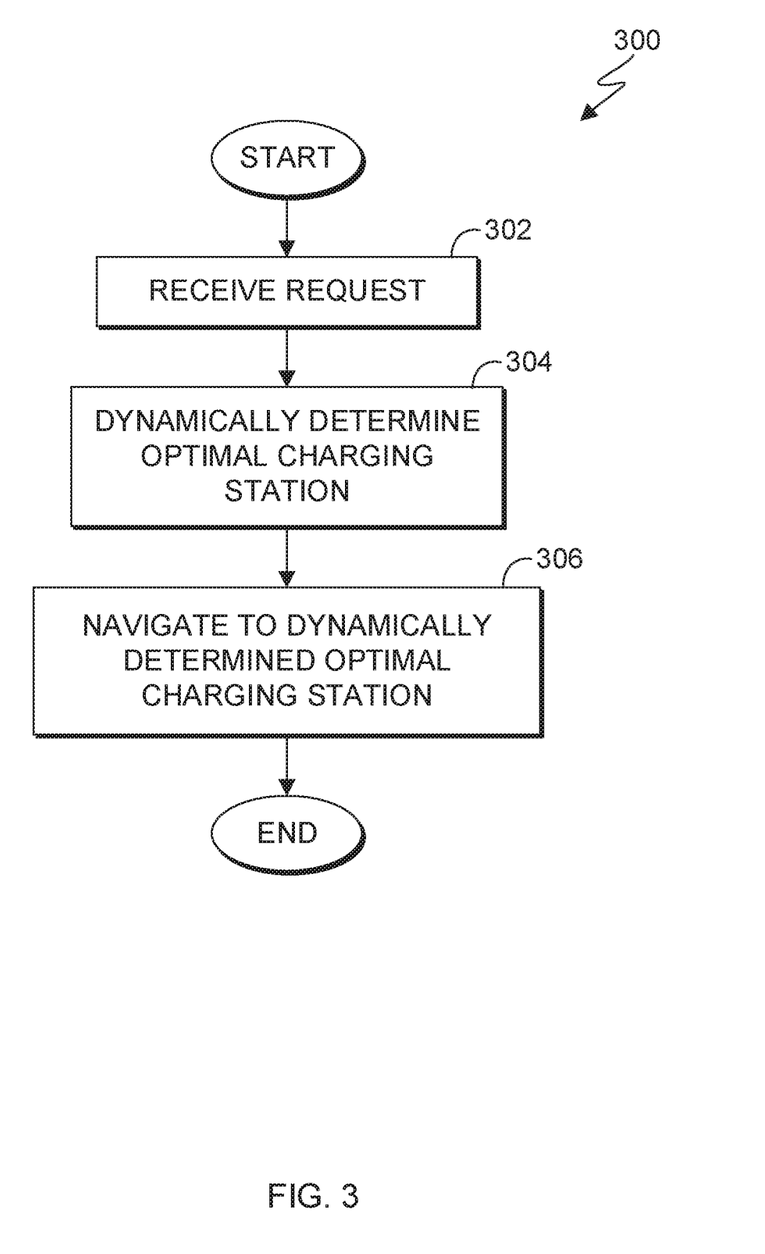
FIG. 3 is a flowchart depicting operational steps for dynamically determining and subsequently navigating to an optional charging station, in accordance with an embodiment of the present invention.
Figure 4:
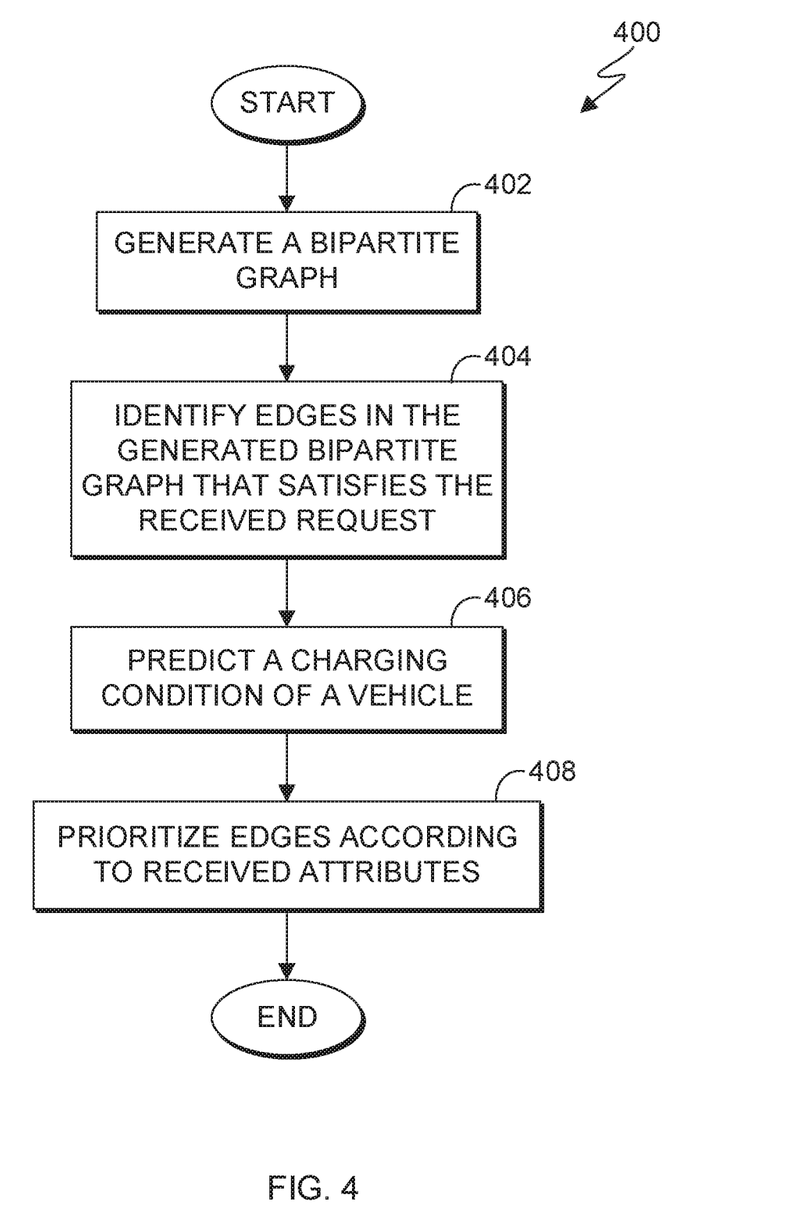
FIG. 4 is a flowchart depicting operational steps for dynamically determining an optional charging station, in accordance with an embodiment of the present invention.

Charge optimization program 110 can leverage or otherwise perform bipartite graph matching to determine the optimal charging station for individual electric vehicles while optimizing the travel time, queue length, charging time, traffic pattern, solar charge availability, weather etc. all attributes as discussed in greater detail with regard to FIGS. 2-4. In scenarios where an electric vehicle indicates that there is a critical attribute change (e.g., based on thresholds) in the already matched charging station, charging optimization program 110 matches the electric vehicle to an alternate charging station (e.g., next best charging station). In instances where there is a sudden rush or changes comes up in the traffic pattern (e.g., long queue, closed roads, etc.) and associated fuel level of vehicle, charge optimization program 110 can recalculate and identify an alternate, optimal charging station and subsequently navigate the vehicle to an intermediate charging station for a temporary (e.g., interim) charge to reach the next best or targeted optimal charging station comfortably.

In this embodiment, charge optimization program 110 can utilize the central system to track the amount of energy required per hour. Charge optimization program 110 can then predict the energy production of coming hours by processing the sun forecasting, tracking the vehicles (e.g., multiple registered vehicles needing to replenish) based on their trip information and road they are using and their amount of energy required to complete the trip.

In certain embodiments, charge optimization program 110 can configure dynamic pricing of charging stations (e.g., price increase or incentives depends on demand/supply). Charge optimization program 110 can also provide insights in a pub-sub model where mobile (e.g., portable) charging stations (e.g., physically moveable charging station or road charging stations) can register and move their portable stations to meet to a specific geolocation to meet the demand spikes at a negotiated spot price. In certain other embodiments, charge optimization program 110 can help determine carbon credits or other incentive systems for each individual station and/or vehicle level and help facilitate exchange of incentives through the system.

Charge optimization program 110 can also determine which charging station of the charging stations connected to the central system needs to be brought down (e.g., a down time window) for maintenance task or any other upgrade etc. Charge optimization program 110 can be fed this information or, in some embodiments can determine which charging station should be taken offline based on weather information (e.g., solar prediction) and historic usage patterns, current day traffic etc. In this way, charge optimization program 110 can determine a best suitable time for maintenance and regulate the solar cell exposure to sun, cell life, etc.

In this way, charge optimization program 110 can enable partial charging station providers to decide the best hours to give out the energy. For example, partial charging station provides can include users having or being able to offer limited charging capacity (e.g., structures such as homes, restaurants, farms etc.) to sell their extra energy meeting specific conditions such as threshold price, a percentage of total produce at a specific time, etc.

In this embodiment, database 112 functions as a repository for stored content. In this embodiment, content refers to training data (e.g., large machine learning datasets) as well as user specific data. Content can include user requirements. In some embodiments, database 112 can function as a repository for one or more files containing user information (e.g., components of user device, vehicle components, user requirements (e.g., charging need, available time, charging capacity of the vehicle, itinerary, current route and navigation information, etc.)). In this embodiment, database 112 is stored on server computer 108 however, database 112 can be stored on a combination of other computing devices (not shown) and/or one or more components of computing environment 100 (e.g., client computing device 102) and/or other databases that has given permission access to charge optimization program 110.

In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

FIG. 2 depicts a block diagram 200 of a charge optimization program, in accordance with an embodiment of the present invention.

In this embodiment, charge optimization program 110 includes registration module 202, data analytics/learning module 204, bipartite graph creator module 206, bipartite graphic matching module 208, vehicle attribute monitor 210, vehicle communication module 212, charging station monitor 214, charging communication module 216, charging station maintenance module 218, charging station maintenance window calculator 220, emergency requirement prediction module 222, insights module 224, charging recommendation module 226, and database 228.

Registration module 202 registers one or more vehicles and one or more charging stations. In this embodiment registration module 202 can actively solicit one or more vehicles to register (e.g., via vehicle communication module 212). In other embodiments, registration module 202 can passively receive registration requests and subsequently register a respective vehicle or charging station. In this embodiment, registration module 202 registers respective vehicle attributes, user information, and charging station information.

Examples of vehicle and user information (e.g., attributes) can include vehicle trip information, type of trip (e.g., leisure, business, etc.), progress of trip, current route information (e.g., navigation information), type of vehicle, battery charge level of the vehicle, average speed of the vehicle, mileage of the vehicle at different terrains, historical energy efficiency, batter condition score, price constraints, etc.

Examples of charging station information (e.g., attributes) include total charging capacity of station, current charge available at the station, price of charging per unit, current day traffic patterns, recommendations, insights (traffic patterns, charge draining etc.) from previous historical data, number of vehicles in the queue, type of vehicles in the queue, sun forecasting details, weather information etc.

Data analytics/learning module 204 can comprise one or more machine and artificial intelligence learning algorithms that can enable charge optimization program 110 to dynamically learn user preferences and optimal routes. In general, data analytics/learning module 204 is used to derive values for average speed of the vehicle at different times, different terrain by different drivers (e.g., system can have profile for multiple users), mileage of the vehicle at different terrain by different users, energy efficiency of the vehicle (e.g., by single or multiple users etc.) by analyzing historical data and the ML algorithms can predict these values for a future travel.

Bipartite graph creator module 206 generates one or more bipartite graphs based on received information (e.g., received vehicle, user, and charging station attributes). Bipartite graphic matching module 208 matches vehicle nodes on the created bipartite graph with charging station nodes that satisfy user requirements. Charge optimization program 110 can then prioritize or otherwise order (e.g., optimize) the changing station nodes that fulfill the user requirements and suggest or otherwise present top ranked charging stations that fulfill the user request.

Vehicle attribute monitor 210 works with vehicle communication module 212 to send attribute information to charge optimization program 110. Vehicle attribute monitor 210 monitors changes in attribute information (e.g., changes in vehicle trip information, type of trip (e.g., leisure, business, etc.), progress of trip, current route information (e.g., navigation information), type of vehicle, battery charge level of the vehicle, average speed of the vehicle, mileage of the vehicle at different terrains, historical energy efficiency, batter condition score, price constraints, etc.)

Charging station monitor 214 works with charging communication module 216 to monitor current charging station attributes and any changes to a respective attribute. Charging station maintenance module 218 can leverage charging communication module 216 to communication maintenance information of respective charging stations. In this embodiment, charging station maintenance module 218 can store maintenance information for a respective charging station. Charging station maintenance module 218 can work with charging station window calculator 220 to calculate an estimated downtime of a charging station and then utilize charging communication module 216 to convey an estimated or otherwise predicted downtime of a charging station. In general, charging station maintenance module 218 decides which charging station to be brought down for maintenance task or any other upgrade based on weather information, historic usage patterns, current day traffic, historical pattern. Charging station maintenance module 218 can also leverage the service of data analytics/learning module 204.

Emergency requirement prediction module 222 can include one or more machine learning and artificial intelligence algorithms to predict a vehicle's current capacity, range, and nearest optimal charging station. In this embodiment, the nearest optimal charging station may be a temporary charging station intended to provide enough charge to get the vehicle and the user associated with the vehicle to an alternate charging station. In some embodiments, the nearest optimal charging station may be a closest fast charging station.

Insights module 224 generates, transmits, and stores insights gained from dynamically determined optimal location based on user requirements. For example, insights module 224 can associated certain optimal location (e.g., charging stations) that were selected because of one or more user requirements and store those matching results as part of a training data set that can be used to train other machine learning modules. Examples of insights can include insights about traffic patterns of the vehicle in context and roads/areas in general (e.g., combining with other sources of data such as maps etc.), charge draining in vehicle or charging stations, usage patterns of charging stations and requirements of energy at specific areas based on dynamic demands etc.

Charging recommendation module 226 dynamically determines optimal charging locations that satisfy user requirements. In this embodiment, charging recommendation module 226 can predict charging condition of a vehicle, identify charging stations that match the user request for a charge, and prioritize or otherwise order matching charging stations according to user preferences and requirements as discussed in greater detail with respect to FIGS. 3 and 4.

Database 228 is functionally equivalent to database 112 of FIG. 1 and similarly functions as a repository for stored content. In this embodiment, content refers to training data (e.g., large machine learning datasets) as well as vehicle attributes, charging station attributes, and user specific data. In general, database 228 can be implemented using any non-volatile storage media known in the art. For example, database 228 can be implemented with a tape library, optical library, one or more independent hard disk drives, or multiple hard disk drives in a redundant array of independent disk (RAID).

FIG. 3 is a flowchart 300 depicting operational steps for dynamically determining and subsequently navigating to an optional charging station, in accordance with an embodiment of the present invention.

In step 302, charge optimization program 110 receives a request. In this embodiment, charge optimization program 110 receives a request from client computing device 102. In other embodiments, charge optimization program 110 can receive a request from one or more other components of computing environment 100.

In this embodiment, charge optimization program 110 receives a request to charge from one or more electric vehicles needing charge. In this embodiment a request can include user and vehicle information. In this embodiment, charge optimization program 110 receives information by transmitting instructions to an agent installed on client computing device 102 to transmit information to charge optimization program 110. In this embodiment, user and vehicle information can include performance metrics such as response time, channel capacity, latency, completion time, service time, bandwidth, relative efficiency, etc. Information can also include user preferences and behavior (e.g., user specified information regarding reservation times, charging periods, charging preferences, etc.). Information can also include vehicle identification numbers (or similar unique device identification) attribute information for each application installed on the user device (e.g., client computing device 102). Information can include version information, patches installed, operating systems used, etc.

Information can also include attribute information for respective vehicles and charging stations. As mentioned before attribute information can include vehicle trip information, type of trip (e.g., leisure, business, etc.), progress of trip, current route information (e.g., navigation information), type of vehicle, battery charge level of the vehicle, average speed of the vehicle, mileage of the vehicle at different terrains, historical energy efficiency, batter condition score, price constraints, etc. while examples of charging station information (e.g., attributes) include total charging capacity of station, current charge available at the station, price of charging per unit, current day traffic patterns, recommendations, insights (traffic patterns, charge draining etc.) from previous historical data, number of vehicles in the queue, type of vehicles in the queue, sun forecasting details, weather information etc.

In step 304, charge optimization program 110 dynamically determines one or more optimal charging stations. In this embodiment, charge optimization program 110 dynamically determines one or more optimal charging stations by generating a bipartite graph, identifying edges in the generated bipartite graph that satisfies the received request, predict a charging condition of a vehicle, and prioritize edges according to the received attributes as discussed in greater detail with respect to FIG. 4.

In step 306, charge optimization program 110 navigates a user to the dynamically determined optimal charging station. In this embodiment, charge optimization program 110 navigates or routes the requesting vehicle to the dynamically determined, optimal charging station. In this embodiment, charge optimization program 110 routes the received request to the dynamically determined, optimal charging station by interfacing with an existing navigation service to transmit instructions to the requesting vehicle.

FIG. 4 is a flowchart 400 depicting operational steps for dynamically determining an optional charging station, in accordance with an embodiment of the present invention.

In step 402, charge optimization program 110 generates a bipartite graph. In this embodiment, charge optimization program 110 generates a bipartite graph comprising two sides. Charge optimization program 110 places nodes on the left side that represent vehicles connected to the central system node, with each vehicle node having a set of attributes associated with the vehicle and user such as vehicle trip information, type of trip (e.g., leisure, business, etc.), progress of trip, current route information (e.g., navigation information), type of vehicle, battery charge level of the vehicle, average speed of the vehicle, mileage of the vehicle at different terrains, historical energy efficiency, batter condition score, price constraints, etc.

Charge optimization program 110 labels the right side of the graph with nodes representing charging station with each charging station, each charging station node including attributes associated with respective charging locations such as total charging capacity of station, current charge available at the station, price of charging per unit, current day traffic patterns, recommendations, insights (traffic patterns, charge draining etc.) from previous historical data, number of vehicles in the queue, type of vehicles in the queue, sun forecasting details, weather information etc.

In step 404, charge optimization program 110 identifies edges in the generated bipartite graph that satisfies the received request. Charge optimization program 110 calculates the edge to be the distance between the vehicle (e.g., node) to respective charging stations (e.g., another node) and selects nodes that can fulfill (e.g., meet) user requirements and is along the navigation route (e.g., via graph matching). The distance is between node (vehicle) to node (charging station). The actual distance can be leveraged using GPS systems.

In step 406, charge optimization program 110 predicts a charging condition of a vehicle. In this embodiment, charge optimization program 110 predicts a charging condition of a vehicle using machine learning models to account for current charge levels and predict an amount of charge needed by the vehicle when the vehicle reaches the optimal charge station based on current driving conditions, and historical driving information.

In this embodiment, charge optimization program 110 predicts a charging condition of a vehicle based on received information such as type of vehicle, mileage, traffic conditions, fuel levels, charging stations available on the route, traffic block, traffic diversion etc. Charge optimization program 110 can also keep track of fuel levels, usage patterns, weather conditions (e.g., conditions that affect power generation) etc. of charging stations. Considering all these, charge optimization program 110 predicts and subsequently recommends charging conditions even if the user does not request for fuel refill.

In step 408, charge optimization program 110 prioritizes edges according to received attributes and the received user request. In this embodiment, charge optimization program 110 prioritizes edges (e.g., nodes, that is charging stations that satisfy user requirements for charge) according to received attributes by assigning confidence scores to each attribute of the charging station. In this embodiment, charge optimization program 110 performs graph matching to determine nodes that satisfy a user's request for a charge (e.g., that can accommodate charging of the user's vehicle) and then prioritizes each edge (e.g., distance from the user vehicle to a charging station) based on attributes required by the user (e.g., proximity to user, proximity to user's intended location) and constraints of the each respective charging station (e.g., ability to charge, number of charging stalls, at the charging station, available power, etc.). For example, charge optimization program 110 assigns a weighted value for each of the user requirements (e.g., proximity to user, proximity to user's intended location (e.g., a waypoint such as a restaurant), itinerary, allotted time, etc.) and assigns respective weighted values with respect to attributes of a respective charging station (e.g., previous success rate, user feedback, outages, convenient location, quality, service, waiting period, capacity). Charge optimization program 110 can then add each assigned weighted value to get a total score and subsequently selects and recommends the charging station with the highest total score as the optimal location.

Charge optimization program 110 can then determine the optimal charging station for individual electric vehicles by dynamically and iteratively calculating confidence values to optimize the travel time, queue length, charging time, traffic pattern, solar charge availability, weather etc.

Figure 5:
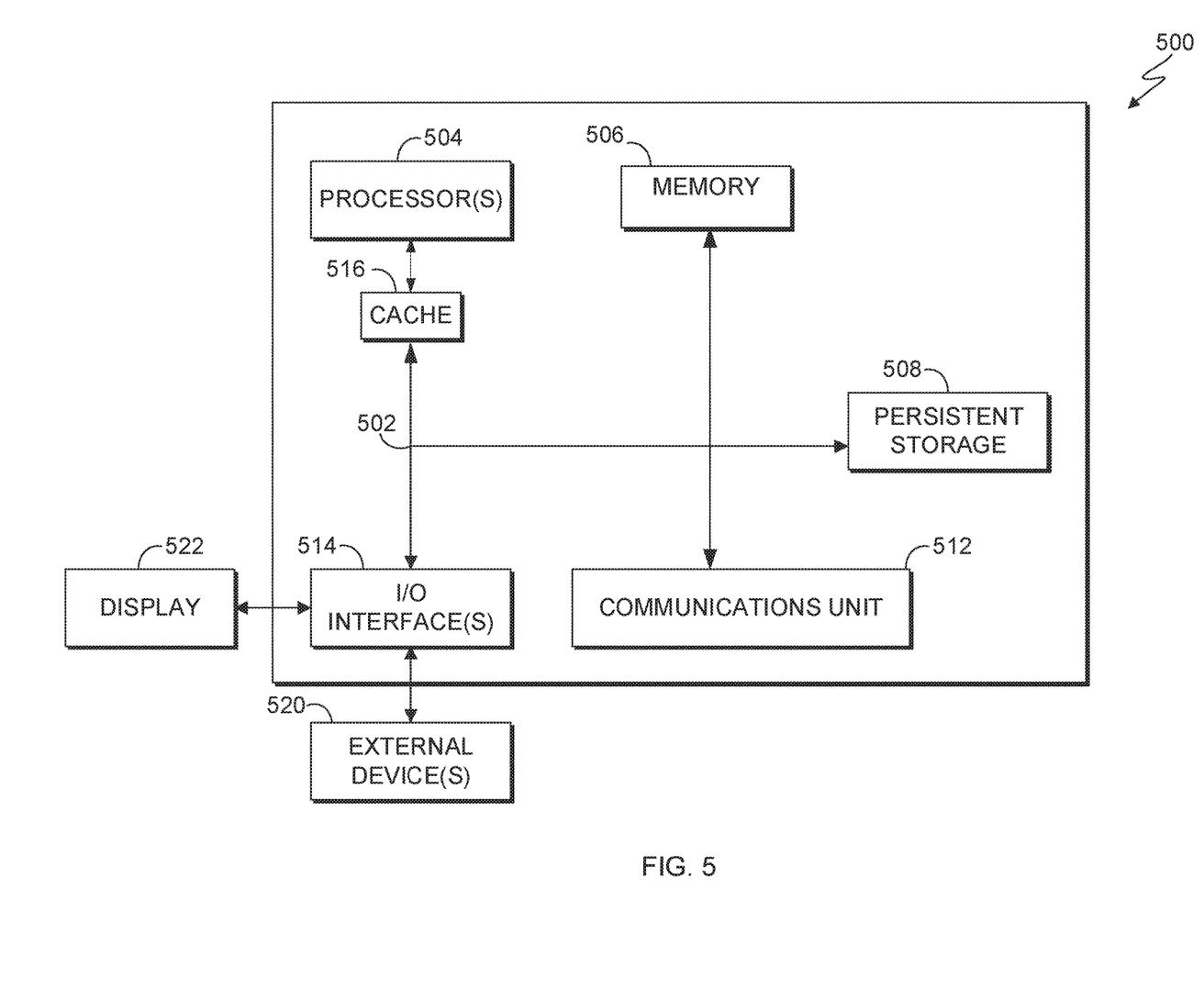
FIG. 5 is a block diagram of an example system, in accordance with an embodiment of the present invention.

In scenarios where an electric vehicle indicates that there is a critical attribute change (e.g., based on thresholds) in the already matched charging station, charging optimization program 110 matches the electric vehicle to an alternate charging station (e.g., next best charging station). In instances where there is a sudden rush or changes comes up in the traffic pattern (e.g., long queue, closed roads, etc.) and associated fuel level of vehicle, charge optimization program 110 can recalculate and identify an alternate, optimal charging station and subsequently navigate the vehicle to an intermediate charging station for a temp (e.g., interim) charge to reach the next best or targeted optimal charging station comfortably FIG. 5 depicts a block diagram of components of computing systems within computing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 500 includes communications fabric 502, which provides communications between cache 516, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Charge optimization program 110 (not shown) may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links. Charge optimization program 110 may be downloaded to persistent storage 508 through communications unit 512.

I/O interface(s) 514 allows for input and output of data with other devices that may be connected to client computing device and/or server computer. For example, I/O interface 514 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards. Software and data used to practice embodiments of the present invention, e.g., charge optimization program 110, can be stored on such portable computer readable storage media and can be loaded onto persistent storage 508 via I/O interface(s) 514. I/O interface(s) 514 also connect to a display 522.

Display 522 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
in response to receiving a request for a charge of a vehicle, dynamically determining an optimal charging station for the vehicle using a bipartite graph, the dynamically determining including:
generating the bipartite graph to facilitate determining the optimal charging station for the vehicle, the bipartite graph comprising nodes representing a plurality of charging stations;
identifying one or more edges of the generated bipartite graph that satisfy the received request for charge; and
prioritizing the identified edges according to the received request for charge; and
navigating a user to the dynamically determined optimal charging station.

2. The computer-implemented method of claim 1, wherein a request for a charge includes:
vehicle trip information, type of trip, progress of the trip, current route information, type of vehicle, charge level of the vehicle, average speed of the vehicle, current mileage of the vehicle, historical energy efficiency of the vehicle, battery condition of the vehicle, different user profiles associated with the vehicle, and efficiency of the vehicle at different terrains.

3. The computer-implemented method of claim 1, wherein dynamically determining an optimal charging station using the bipartite graph further comprises:
receiving attribute information for a charging station in the plurality of charging stations; and
generating the bipartite graph with nodes representing each charging station of the plurality of charging stations and each registered vehicle of a plurality of registered vehicles.

4. The computer-implemented method of claim 3, further comprising:
predicting a charge condition of the vehicle associated with the request.

5. The computer-implemented method of claim 1, further comprising:
monitoring attributes of each charging station in the plurality of charging stations, wherein attributes of each charging station include total charging capacity each respective charging station, current charge available at a respective charging station, price of charging per unit at the respective charging station, and current day traffic patterns.

6. The computer-implemented method of claim 5, further comprising:
determining a down time window for a charging station of the plurality of charging stations based on the monitored attributes.

7. The computer-implemented method of claim 1, further comprising:
in response to receiving a critical attribute change, dynamically recalculating an optimal charging station for the vehicle using the bipartite graph.

8. A computer program product comprising:
one or more computer readable storage media and program instructions stored on the one or more computer readable storage media, the program instructions comprising:
program instructions to, in response to receiving a request for a charge of a vehicle, dynamically determine an optimal charging station for the vehicle using a bipartite graph, the dynamically determining including:
generating the bipartite graph to facilitate determining the optimal charging station for the vehicle, the bipartite graph comprising nodes representing a plurality of charging stations;
identifying one or more edges of the generated bipartite graph that satisfy the received request for charge; and
prioritizing the identified edges according to the received request for charge; and
program instructions to navigate a user to the dynamically determined optimal charging station.

9. The computer program product of claim 8, wherein a request for a charge includes:
vehicle trip information, type of trip, progress of the trip, current route information, type of vehicle, charge level of the vehicle, average speed of the vehicle, current mileage of the vehicle, historical energy efficiency of the vehicle, battery condition of the vehicle, different user profiles associated with the vehicle, and efficiency of the vehicle at different terrains.

10. The computer program product of claim 8, wherein the program instructions to dynamically determine an optimal charging station using the bipartite graph further comprise:
program instructions to receive attribute information for a charging station in the plurality of charging stations; and
program instructions to generate the bipartite graph with nodes representing each charging station of the plurality of charging stations and each registered vehicle of a plurality of registered vehicles.

11. The computer program product of claim 10, wherein the program instructions stored on the one or more computer readable storage media further comprise:
program instructions to predict a charge condition of the vehicle associated with the request.

12. The computer program product of claim 8, wherein the program instructions stored on the one or more computer readable storage media further comprise:
program instructions to monitor attributes of each charging station in the plurality of charging stations, wherein attributes of each charging station include total charging capacity each respective charging station, current charge available at a respective charging station, price of charging per unit at the respective charging station, and current day traffic patterns.

13. The computer program product of claim 12, wherein the program instructions stored on the one or more computer readable storage media further comprise:
program instructions to determine a down time window for a charging station of the plurality of charging stations based on the monitored attributes.

14. The computer program product of claim 8, wherein the program instructions stored on the one or more computer readable storage media further comprise:
  program instructions to, in response to receiving a critical attribute change, dynamically recalculate an optimal charging station for the vehicle using the bipartite graph.

15. A computer system for comprising:
one or more computer processors;
one or more computer readable storage media; and
program instructions stored on the one or more computer readable storage media for execution by at least one of the one or more computer processors, the program instructions comprising:
  program instructions to, in response to receiving a request for a charge of a vehicle, dynamically determine an optimal charging station for the vehicle using a bipartite graph, the dynamically determining including:
    generating the bipartite graph to facilitate determining the optimal charging station for the vehicle, the bipartite graph comprising nodes representing a plurality of charging stations;
    identifying one or more edges of the generated bipartite graph that satisfy the received request for charge; and
    prioritizing the identified edges according to the received request for charge; and
  program instructions to navigate a user to the dynamically determined optimal charging station.

16. The computer system of claim 15, wherein a request for a charge includes:
  vehicle trip information, type of trip, progress of the trip, current route information, type of vehicle, charge level of the vehicle, average speed of the vehicle, current mileage of the vehicle, historical energy efficiency of the vehicle, battery condition of the vehicle, different user profiles associated with the vehicle, and efficiency of the vehicle at different terrains.

17. The computer system of claim 15, wherein the program instructions to dynamically determine an optimal charging station using the bipartite graph further comprise:
  program instructions to receive attribute information for a charging station in the plurality of charging stations; and
  program instructions to generate the bipartite graph with nodes representing each charging station of the plurality of charging stations and each registered vehicle of a plurality of registered vehicles.

18. The computer system of claim 17, wherein the program instructions stored on the one or more computer readable storage media further comprise:
  program instructions to predict a charge condition of the vehicle associated with the request.

19. The computer system of claim 15, wherein the program instructions stored on the one or more computer readable storage media further comprise:
  program instructions to monitor attributes of each charging station in the plurality of charging stations, wherein attributes of each charging station include total charging capacity each respective charging station, current charge available at a respective charging station, price of charging per unit at the respective charging station, and current day traffic patterns.

20. The computer system of claim 19, wherein the program instructions stored on the one or more computer readable storage media further comprise:
  program instructions to determine a down time window for a charging station of the plurality of charging stations based on the monitored attributes.

* * * * *